F. A. SMITH.
SHOCK ABSORBER.
APPLICATION FILED OCT. 25, 1920.

1,409,600.

Patented Mar. 14, 1922.

WITNESSES

INVENTOR
FRANK A. SMITH
BY
ATTORNEYS

UNITED STATES PATENT OFFICE.

FRANK ASBURY SMITH, OF ORANGE, NEW JERSEY.

SHOCK ABSORBER.

1,409,600. Specification of Letters Patent. Patented Mar. 14, 1922.

Application filed October 25, 1920. Serial No. 419,327.

*To all whom it may concern:*

Be it known that I, FRANK ASBURY SMITH, a citizen of the United States, and a resident of Orange, in the county of Essex and State of New Jersey, have invented a new and Improved Shock Absorber, of which the following is a full, clear, and exact description.

This invention relates to shock absorbers for vehicles and particularly to improved shock absorbers for automobiles.

An object in view is to provide an absorber for automobile or other vehicles of the same general structure wherein the shocks are cushioned or absorbed to a greater or less extent without lessening the strength and endurance of the machine.

Another object of the invention is to provide a shock absorber arranged between the springs of an automobile and the axle which have parts which multiply any movement of the device in order to produce a sensitive action.

A still further object more specifically is the arrangement of a pair of hinged plates between the spring and axle of an automobile associated with a lever mechanism supported by a spring, the arrangement of the lever mechanism being such that a slight movement of the plates toward or from each other will produce a magnified movement of the spring.

In the accompanying drawing—

Referring to the accompanying drawing by numerals 1 indicates an automobile of a well known make now on the market. In this make of automobile some of the springs 2 act as connecting means for connecting the chassis frame with the axle and, consequently, must be extra stiff in order to hold the axle in proper place. The resilient effect of the springs is destroyed to a large extent by their stiffness which is necessary for holding the parts in proper position, and consequently, there is an appreciable jar and also an appreciable rebound whenever any of the wheels 3 pass over an obstruction or into a depression. By reason of these conflicting duties of the spring and a construction which attempts to answer both requirements, a finished article is produced which does not give all the satisfaction desired.

Figure 1:
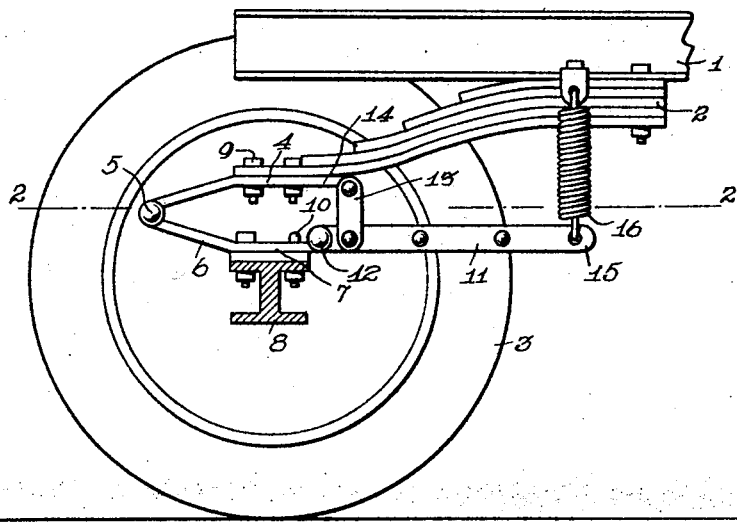
Figure 1 is a fragmentary sectional view showing part of an automobile wth an absorber embodying the invention shown applied.
Figure 2:
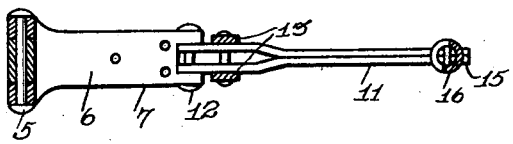
Figure 2 is a horizontal section through an absorber embodying the invention, the same being taken approximately on line 2—2 of Figure 1.

In the present invention, a construction is presented which will permit the spring 2 to act in the usual manner both as a spring and as means for holding certain parts in their desired relative position. This construction is formed with a top or hinge plate 4 hinged at 5 to an upward extension 6 of the stationary or fixed plate 7 bolted or otherwise rigidly secured to the axle 8. The openings in the plates 4 and 7 are such as to co-act with the usual bolt holes in the spring 2 and the axle 8. Of course, separate groups of bolts 9 and 10 must be provided for holding their respective plates to the spring 2 and axle 8 respectively as shown in Figure 1. A lever 11 is pivotally connected at 12 to the stationary plate 7 and carries a toggle or link structure 13 which is pivotally connected thereto and also pivotally connected to an extension 14 projecting from the plate 4.

By this construction and arrangement whenever the wheel 3 strikes an obstruction and is raised upwardly, the weight of the body 1 and associated parts will resist this upward movement so that plate 7 will move upwardly and swing the outer end 15 of lever 11 downwardly and thereby stretch the spring 16 connected to the end 15 and to the body 1 in any suitable manner. The action of spring 16, therefore, takes up this shock and automatically adjusts the parts to their former position when the wheel is moved over the obstruction.

By reason of the fact that plates 4 and 7 are comparatively wide and provided with a very strong hinge structure 5, the spring 2 connected to plate 4 will hold the axle 8 and associated parts in their correct position the same as if the spring was directly connected to axle 8.

The construction has been designed to co-act with devices substantially as shown in Figure 1 but it will be evident that the invention may be used on slightly other different types where it is capable of proper application.

What I claim is:—

1. A shock absorber comprising a fixed member adapted to be secured to the axle of an automobile, a swinging member hinged to the fixed member so as to be normally spaced therefrom, said swinging member being adapted to be connected with the springs of the automobile, a toggle construction connecting the free ends of said members said toggle construction comprising a lever and a link connected to the said lever having an extended arm and a spring connected with the end of said extended arm and with the chassis of said automobile.

2. A shock absorber for automobiles comprising a pair of plates pivotally connected together adapted to be connected to the springs and axles respectively of the automobile, a toggle structure connecting said plates together, said toggle structure having one of the members formed with an extending arm and a spring connecting said extending arm with the chassis of the automobile, whereby the movement of said members will be multiplied when acting on said spring.

FRANK ASBURY SMITH.